(12) United States Patent
Trnka et al.

(10) Patent No.: US 11,186,201 B2
(45) Date of Patent: Nov. 30, 2021

(54) CALCULATE LIFETIME OF A BATTERY BASED ON BATTERY USE DATA FROM MULTIPLE NETWORK CONNECTED ELECTRIC VEHICLES

(71) Applicant: Honeywell International Inc., Morris Plains, NJ (US)

(72) Inventors: Pavel Trnka, Prague (CZ); Vladimir Havlena, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 131 days.

(21) Appl. No.: 15/953,211

(22) Filed: Apr. 13, 2018

(65) Prior Publication Data

US 2019/0315237 A1  Oct. 17, 2019

(51) Int. Cl.
*B60L 58/16* (2019.01)
*G07C 5/00* (2006.01)
*G07C 5/08* (2006.01)
*G06N 5/04* (2006.01)

(52) U.S. Cl.
CPC .............. *B60L 58/16* (2019.02); *G06N 5/04* (2013.01); *G07C 5/008* (2013.01); *G07C 5/085* (2013.01)

(58) Field of Classification Search
CPC ...... B60L 3/12; B60L 58/16; B60L 2240/545; B60L 2240/549; B60L 2240/80; B60L 2260/50; G06N 5/04; G07C 5/008; G07C 5/085; H01M 10/42
See application file for complete search history.

(56) References Cited

U.S. PATENT DOCUMENTS

| | | | | |
|---|---|---|---|---|
| 2009/0027056 | A1* | 1/2009 | Huang | B60L 58/12 324/439 |
| 2014/0358459 | A1* | 12/2014 | Trnka | G01R 31/367 702/63 |
| 2016/0161567 | A1* | 6/2016 | Park | G01R 31/392 702/63 |
| 2017/0123009 | A1* | 5/2017 | You | B60L 58/16 |
| 2018/0083461 | A1* | 3/2018 | Ravi | H02J 13/0003 |
| 2018/0143257 | A1* | 5/2018 | Garcia | G01R 31/367 |
| 2019/0039467 | A1* | 2/2019 | Hortop | B60L 53/64 |
| 2019/0176639 | A1* | 6/2019 | Kumar | B60L 58/12 |
| 2019/0346513 | A1* | 11/2019 | Markochev | G01R 31/392 |

* cited by examiner

*Primary Examiner* — Anshul Sood
(74) *Attorney, Agent, or Firm* — Brooks, Cameron & Huebsch, PLLC

(57) ABSTRACT

Devices, methods, systems, and computer-readable media for calculating a battery lifetime of an electric vehicle are described herein. One or more embodiments include receiving via a wide area network, at a network computing device, actual battery use data of a specific electric vehicle, expected battery use data, and battery use data from each of a one or more network connected electric vehicles and calculating an estimated lifetime of a battery of the specific electric vehicle based on the actual battery use data, the expected battery use data, and the battery use data from the one or more network connected electric vehicles.

18 Claims, 3 Drawing Sheets

US 11,186,201 B2

CALCULATE LIFETIME OF A BATTERY BASED ON BATTERY USE DATA FROM MULTIPLE NETWORK CONNECTED ELECTRIC VEHICLES

TECHNICAL FIELD

The present disclosure relates to methods, devices, systems, and computer-readable media for calculating a battery lifetime of an electric vehicle.

BACKGROUND

A lifetime of a battery is the operation time before the battery's capacity drops below a threshold value. The battery lifetime can be predicted by assuming an expected battery use. Currently, many manufacturers calculate battery lifetime based on testing done in laboratory conditions under repeating current profiles and constant temperatures. This testing does not always reflect battery lifetime when operated in certain driving conditions.

A need for a more accurate battery lifetime prediction is increasing due to the increase in number of electric and/or hybrid vehicles in use. The battery lifetime prediction can assist in planning battery servicing and replacement. The battery lifetime prediction can also be used to assess residual (e.g., market) value of a battery.

The state of health (SoH) is an indicator commonly used to capture actual battery health in the electric vehicle industry. The SoH is a percentage ratio of the actual to the nominal battery capacity. However, the SoH gives limited insight into the remaining battery lifetime because it captures the actual battery capacity, but it does not indicate how heavily the battery was used or even misused. For example, the battery can be misused if the battery is operated out of the temperature specification range and/or if the battery is overcharged. This misuse can lead to a shorter battery lifetime.

DETAILED DESCRIPTION

Figure 1:
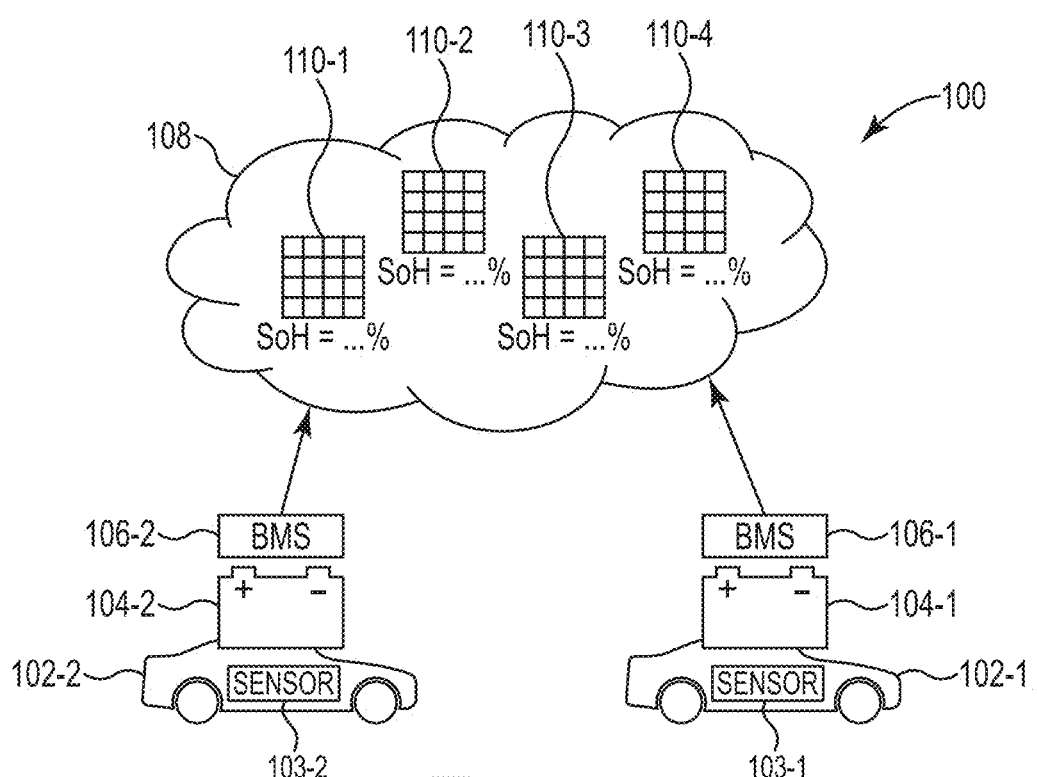
FIG. 1 is a diagram of an example wide area network connected to one or more network connected electric vehicles that can be utilized according to an embodiment of the present disclosure.

A battery lifetime of an electric vehicle can be calculated according to embodiments of the present disclosure. For example, in some embodiments, the lifetime of the battery can be calculated by a network computing device based on actual battery use data of a specific electric vehicle, expected battery use data, and battery use data collected from one or more network connected electric vehicles.

In various embodiments, each of the electric vehicles can be powered by one or more batteries and can have one or more sensors for collecting the battery use data. A wide area network can connect the one or more network connected electric vehicles to a database which is used to collect the data for analysis.

A processor at a network device can be configured to execute instructions to send data from one or more electric vehicles to the database. In various embodiments, the one or more electric vehicles can send the data continuously, after a particular distance traveled, and/or after a particular battery charge throughput, for example.

Within the vehicle, the battery use data can be sent, for example, from a battery management system (BMS) in each of the one or more electric vehicles to the database. In some embodiments, a processor and memory can be in the vehicle and the database in memory can send the battery use data to a network computing device for analysis. In some examples, the battery use data can be sent as one or more histograms.

Devices, methods, systems, and computer-readable media for calculating a battery lifetime of an electric vehicle are described herein. One or more embodiments include using actual battery use data to calculate the lifetime of the battery. The actual battery use data can be data from the battery whose battery lifetime is being calculated. For example, the actual battery use data can be from a specific electric vehicle.

The actual battery use data can include state of health data of the specific battery. The state of health data can be a percentage ratio of the actual battery capacity over the nominal battery capacity. In some examples, the actual battery use data can also include state of charge, charge throughput, current amplitude, time duration, and temperature data.

As discussed above, in some embodiments, the battery use data can be contained in battery histograms, for example. The actual battery use data can be in an actual battery use histogram, the expected battery use data can be in an expected battery use histogram, and/or the battery use data from the one or more network connected electric vehicles can be in battery use histograms.

As discussed in more detail below, in some embodiments, the histograms used for analysis can include operation histograms and/or storage histograms. In some implementations, histograms can be useful in reducing the amount of data passed through the network which reduces the load on the network's bandwidth.

The expected battery use data, the actual battery use data, and the battery use data from the one or more network connected electric vehicles described herein can be utilized, for example, to calculate a capacity degradation of a battery. In some examples, the capacity degradation of a battery can otherwise be known as state of health (SoH) of a battery. The SoH is a percentage ratio of the actual to the nominal battery capacity.

The SoH of a battery can be calculated by interpolating an actual battery use histogram derived from actual battery use data. The SoH can be used to calculate the lifetime of the battery by, for example, combining an actual battery use histogram and an expected battery use histogram and estimating a period of time after which a predicted battery SoH reaches a threshold value.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit corresponds to the drawing figure number and the remaining digits identify an element or component in the drawing. Similar elements or components between different figures may be identified by the use of similar remaining digits.

As used herein, "a" or "a number of" something can refer to one or more such things. For example, "a number of devices" can refer to one or more devices. Additionally, the designator "N", as used herein, particularly with respect to reference numerals in the drawings, indicates that a number of the particular feature so designated can be included with a number of embodiments of the present disclosure.

FIG. 1 is a diagram of an example wide area network connected to one or more network connected electric vehicles that can be utilized according to an embodiment of the present disclosure. In some examples, a wide area network 100 connects one or more electric vehicles 102-1, 102-2 to a database 108.

The one or more electric vehicles 102-1, 102-2 can be powered by one or more batteries 104-1, 104-2. The one or more electric vehicles 102-1, 102-2 can include one or more sensors 103-1, 103-2 for collecting battery use data.

The one or more electric vehicles 102-1, 102-2 can also include battery management systems 106-1, 106-2. The battery management systems 106-1, 106-2 can collect and send the battery use data to the database 108.

As discussed above, the battery use data can be sent from the one or more of the electric vehicles 102-1, 102-2 after a particular distance traveled by the one or more electric vehicles 102-1, 102-2. The data can also be sent from one or more electric vehicles 102-1, 102-2 after a particular battery charge throughput of the one or more batteries 104-1, 104-2, or continuously communicated, in some embodiments. In some examples, the battery use data can be collected during vehicle servicing.

The battery use data can include state of health data of the one or more batteries 104-1, 104-2. The state of health data of a battery can be a percentage ratio of an actual battery capacity over a nominal battery capacity. The battery use data can be organized in histograms 110-1, . . . , 110-4. For example, the histograms 110-1, . . . , 110-4 can be operation and/or storage histograms.

The database 108 can receive battery use data from the one or more network connected electric vehicles 102-1, 102-2. The battery use data from the database 108 can be used to calculate a lifetime of a battery.

The battery use data from the database 108 can also be used to calculate capacity degradation of the battery. In some examples, actual battery use data from the specific battery and the expected battery use data can be used with the battery use data to calculate the lifetime of the battery and/or the capacity degradation of the battery.

Figure 2:
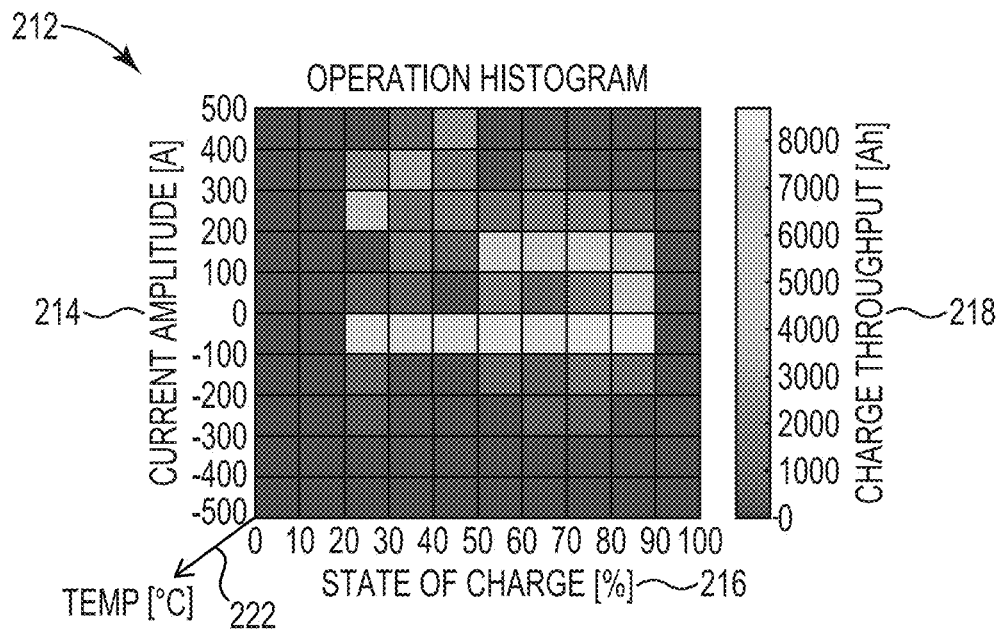
FIG. 2 is an operation histogram illustrating battery data according to an embodiment of the present disclosure.

FIG. 2 is an operation histogram illustrating battery data according to an embodiment of the present disclosure. The operation histogram 212 illustrates how much charge went through a battery at a particular current amplitude, at a particular temperature and at a particular state of charge during operation of an electric vehicle. The operation histogram 212 includes current amplitude 214, temperature 222, state of charge 216, and charge throughput 218 data.

The current amplitude 214 is the current in amperes that a battery of an electric vehicle is operating in. The temperature 222 is the temperature in Celsius that a battery of an electric vehicle is operating in.

The state of charge 216 is a current percentage of charge the battery of the electric vehicle has left. For example, the units of state of charge are percentage points, where 0% can indicate the battery is empty and 100% can indicate the battery is full. The charge throughput in Ampere-hour (Ah) is the charge throughput by the battery of the electric vehicle and indicates the energy that is delivered or stored by the battery of the electric vehicle.

In some examples, the current amplitude 214, temperature 222, state of charge 216, and the charge throughput 218 data can be collected using one or more sensors (e.g., sensors 103-1, 103-2 in FIG. 1) on the batteries (e.g., batteries 104-1, 104-2 in FIG. 1) and/or the electric vehicles (e.g., electric vehicles 102-1, 102-2 in FIG. 1). The battery use data can be sent to the database via the wide area network (e.g., wide area network 100 in FIG. 1) connected to the electric vehicles.

The battery use data can be sent from the one or more electric vehicles after a particular distance traveled by the one or more electric vehicles. The data can also be sent from the one or more electric vehicles after a particular battery charge throughput of the one or batteries is reached. In some implementations, sending data after a particular distance and/or after a particular battery charge throughput can be useful in reducing the amount of data passed through the wide area network (e.g., wide area network 100 in FIG. 1). It can also reduce the bandwidth and time needed for a network computing device to analyze the battery use data.

In some examples, the network computing device can receive the battery use data from the one or more electric vehicles (e.g., electric vehicles 102-1, 102-2 in FIG. 1). The current amplitude 214, the temperature 222, the state of charge 216, and the charge throughput 218 data can be organized into an operation histogram 212.

The battery use data can be organized into an operation histogram 212 to reduce the amount of data passed through the wide area network (e.g., wide area network 100 in FIG. 1). Reducing the amount of data passed through the wide area network can reduce the load on the wide area network's bandwidth, for example.

An operation histogram 212 can be created with battery use data on an electric vehicle. In some examples, the operation histogram 212 can be used to calculate the state of health of a battery.

Figure 3:
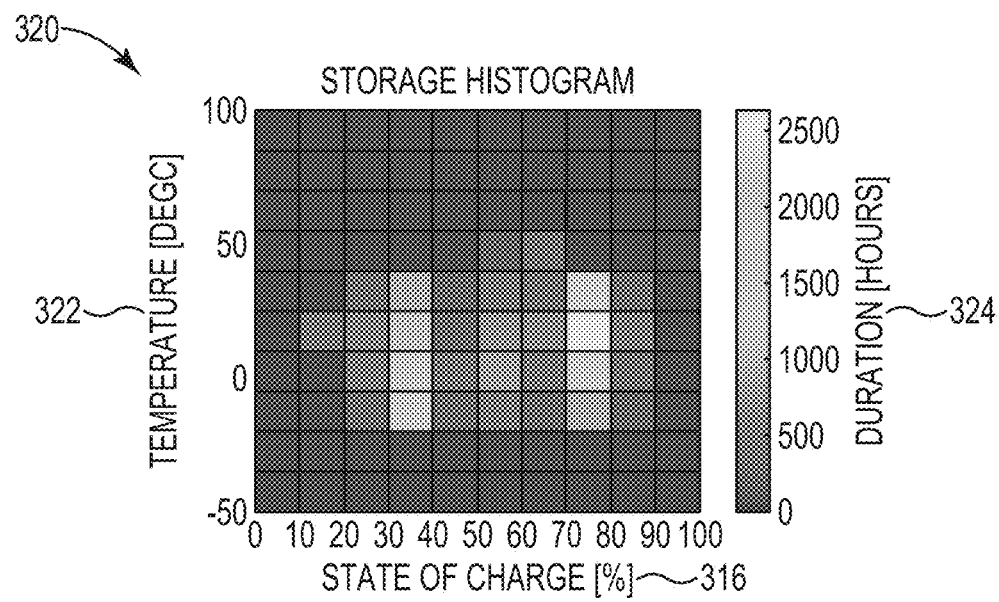
FIG. 3 is a storage histogram illustrating battery data according to an embodiment of the present disclosure.

FIG. 3 is a storage histogram illustrating battery data according to an embodiment of the present disclosure. The storage histogram 320 illustrates how long a battery was stored at a particular temperature and at a particular state of charge. The storage histogram 320 includes temperature 322, state of charge 316, and duration 324 data.

The temperature 322 is the temperature (e.g., in Celsius) that a battery of an electric vehicle is operating in. The state of charge 316 is a current percentage of charge the battery of the electric vehicle has left.

For example, the units of state of charge are illustrated as percentage points, where 0% can indicate the battery is at a minimum charge (e.g., empty) and 100% can indicate the battery is at a maximum charge (e.g., full). The time duration 324 in hours is the amount of time the battery of the electric vehicle is operated in a particular temperature and state of charge.

In some examples, the temperature 322, the state of charge 316, and the time duration 324 data can be collected using one or more sensors (e.g., sensors 103-1, 103-2 in FIG. 1) on the batteries (e.g., batteries 104-1, 104-2 in FIG. 1) and/or the electric vehicles (e.g., electric vehicles 102-1, 102-2 in FIG. 1). The data can be sent to a network computing device via the wide area network (e.g., wide area network 100 in FIG. 1) connected to the electric vehicles.

The data can be sent from the one or more electric vehicles after a particular distance traveled by the one or more electric vehicles. The data can also be sent from the one or more electric vehicles after a particular battery charge throughput of the one or more electric vehicles is reached.

As discussed above, sending data after a particular distance and/or after a particular battery charge throughput can be useful in reducing the amount of data passed through the wide area network (e.g., wide area network 100 in FIG. 1). It can also reduce the bandwidth and time needed for the network computing device to analyze the battery use data.

In some examples, a network computing device can receive, via the wide area network (e.g., wide area network 100 in FIG. 1), the battery use data from the one or more electric vehicles (e.g., electric vehicles 102-1, 102-2 in FIG. 1). The temperature 322, the state of charge 316, and the time duration 324 data can be organized into a storage histogram 320.

The battery use data can be organized in a storage histogram 320 to reduce the amount of data passed through the wide area network (e.g., wide area network 100 in FIG. 1). Reducing the amount of data passed through the wide area network can reduce the load on the wide area network's bandwidth, for example.

A storage histogram 320 can be created with battery use data on an electric vehicle. In some examples, the storage histogram 320 can be used to calculate the state of health of the battery.

Figure 4:
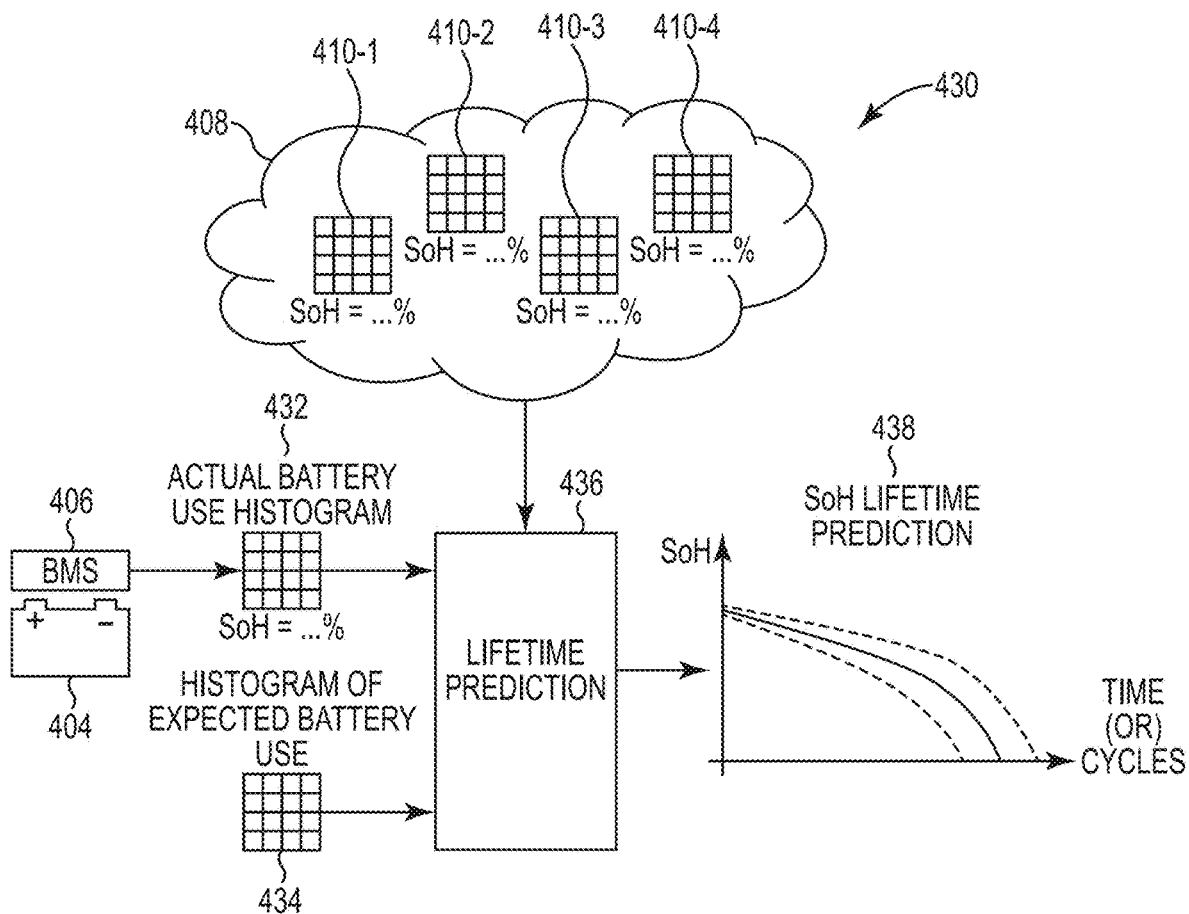
FIG. 4 is a diagram of an example network computing device that can be utilized according to an embodiment of the present disclosure.

FIG. 4 is a diagram of an example network computing device that can be utilized according to an embodiment of the present disclosure. In some examples, an electric vehicle can be powered by a battery 404. The electric vehicle can include one or more sensors (e.g., sensors 103-1, 103-2 in FIG. 1) for collecting battery use data and a battery management system 406.

An actual battery use histogram 432 can be created based on the collected battery use data from the battery 404 of the electric vehicle. The actual battery use data can include state of charge, charge throughput, current amplitude, time duration, and temperature data.

The actual battery use histogram 432 can be created to reduce the load on the wide area network's (e.g., wide area network 100 in FIG. 1) bandwidth by reducing the amount of data passed through the wide area network.

The current amplitude, state of charge, and charge throughput data can be included in an operation histogram (e.g., operation histogram 212 in FIG. 2). The temperature, state of charge, and time duration data can be included in a storage histogram (e.g., storage histogram 320 in FIG. 3).

A histogram of expected battery use 434 can also be created based on a prediction of what the battery use of the electric vehicle will be in the future. The expected battery use data can include state of charge, charge throughput, current amplitude, time duration, and temperature data. For example, if the electric vehicle will be operated in a colder climate, the time duration the battery 404 will be exposed to a colder temperature range will be more than a vehicle in a warmer climate.

The expected battery use data can be organized into a histogram to reduce the amount of data passed through the wide area network (e.g., wide area network 100 in FIG. 1). Reducing the amount of data passed through the wide area network can reduce the load on the wide area network's bandwidth, for example.

A number of histograms 410-1, ..., 410-4 can be created from one or more network connected electric vehicles (e.g., electric vehicles 102-1, 102-2 in FIG. 1) sending battery use data to a database 408 periodically. The battery use data can include state of charge, charge throughput, current amplitude, time duration, and temperature data.

The number of histograms 410-1, ..., 410-4 can be created and sent periodically to reduce the load on the wide area network's (e.g., wide area network 100 in FIG. 1) bandwidth by reducing the amount of data passed through the wide area network.

The one or more network connected electric vehicles (e.g., electric vehicles 102-1, 102-2 in FIG. 1) can also send monitored values of SoH. Laboratory data can be included in the database 408 to provide additional data for calculations. Laboratory data can be included to provide data that may be unavailable and/or not provided by the one or more network connected electric vehicles.

The network computing device 430 can calculate a lifetime prediction 436 of the battery 404. The lifetime prediction 436 can include calculating a SoH of the battery 404.

In some examples, the SoH of the battery 404 can be calculated by interpolating the actual battery use histogram 432 data. The interpolation can be done using the Gaussian Process Regression, for example. The SoH of the battery 404 can be calculated using the actual battery use histogram 432 derived from the battery use data from battery 404. Using the actual battery use histogram 432 derived from the battery use data from battery 404 can result in a more accurate SoH calculation and a more accurate lifetime prediction.

The network computing device 430 can calculate a lifetime prediction of the battery 404 using the SoH of the battery 404. The SoH can be used to calculate the lifetime of the battery 404 by combining an actual battery use histogram 432 and an expected battery use histogram 434 and estimating a period of time after which a predicted battery SoH reaches a threshold value.

In some examples, the SoH lifetime prediction 438 can be expressed as $SoH(t) = f(Q(t_0) + (t-t_0)\overline{Q}$. Where $Q(t_0)$ can be an actual battery histogram and $\overline{Q}$ can be an expected battery use histogram over one unit of time. The function $f$ can assign the SoH to the battery use histograms and the function can be an interpolation based on the database 408 of SoH labeled histograms 410-1, ..., 410-4.

In some examples, interpolating the combined histogram into the predicted SoH at the end of multiple run time periods can be used to calculate the SoH lifetime prediction 438. The future battery capacity degradation trajectory can be calculated using the SoH lifetime prediction 438.

The SoP is the maximum power the battery can release. The SoP over time can decrease. For example, the maximum acceleration of the battery can decrease faster as a result of overcharging and/or storing in particular temperature ranges. In some examples, the SoH, lifetime prediction, and/or the SoP can be used to optimize battery use to avoid rapid battery degradation.

Figure 5:
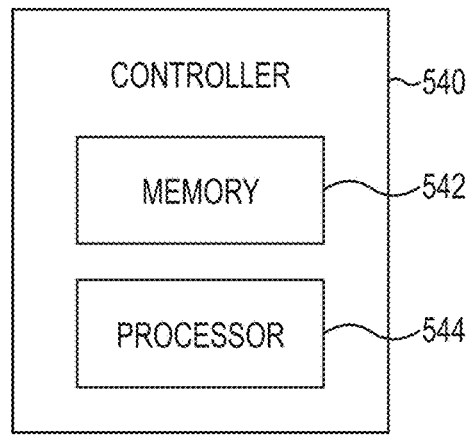
FIG. 5 is an example of a controller that can be utilized according to an embodiment of the present disclosure.

FIG. 5 is an example of a controller that can be utilized according to an embodiment of the present disclosure. The controller 540 can include a memory 542 and a processor 544. The controller 540 can be used for predicting a lifetime (e.g., lifetime prediction 436 in FIG. 4) of a battery (e.g., battery 404 in FIG. 4). The processor 544 can be configured to execute executable instructions stored in the memory 542 to provide and/or use a wide area network (e.g., wide area network 100 in FIG. 1) connected to one or more network connected electric vehicles (e.g., electric vehicles 102-1, 102-2) and receive, at a network computing device (e.g., network computing device 430 in FIG. 4), actual battery use data of a specific electric vehicle, expected battery use data, and battery use data from each of the one or more network connected electric vehicles to calculate the lifetime of a battery of the specific electric vehicle based on actual battery use data, expected battery use data, and the battery use data from the one or more network connected electric vehicles.

In this manner the embodiments of the present disclosure allow actual battery life for a particular vehicle to be more accurately managed and estimated. This can be beneficial in more efficiently managing the lifetime of a battery and potentially allowing a vehicle user to better manage the timing of battery replacement, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A battery management system (BMS) in a specific electric vehicle for predicting a lifetime of a battery, comprising:
    the BMS having:
        a memory;
        a processor configured to execute executable instructions stored in the memory to:
            provide a wide area network connected to multiple network connected electric vehicles, wherein each network connected electric vehicle is powered by one or more batteries and has one or more sensors for collecting battery use data;
            receive, at the BMS, historical battery use data from a first number of the multiple network connected electric vehicles after a battery of one or more of the first number of the multiple network connected electric vehicles reaches a particular battery charge throughput or after a particular distance traveled by one or more of the first number of the multiple network connected electric vehicles to reduce an amount of data passing through the wide area network, actual battery use data from the specific electric vehicle, and expected battery use data from the specific electric vehicle; and
            calculate an estimated lifetime of a battery of the specific electric vehicle based on the historical battery use data, the actual battery use data, and the expected battery use data.

2. The battery management system of claim 1, wherein the processor is further configured to execute instructions to calculate a capacity degradation of the battery of the specific electric vehicle based on the historical battery use data, the actual battery use data, and the expected battery use data.

3. The battery management system of claim 1, wherein the estimated lifetime of the battery of the specific electric vehicle is based on the actual battery use data of the battery of the specific electric vehicle.

4. The battery management system of claim 1, wherein the actual battery use data of the specific electric vehicle includes state of health data of the battery of the specific electric vehicle and battery use histograms of the specific electric vehicle.

5. The battery management system of claim 4, wherein the state of health data of the battery of the specific electric vehicle is a percentage ratio of actual battery capacity of the specific electric vehicle over nominal battery capacity.

6. The battery management system of claim 1, wherein the historical battery use data from the first number of the multiple network connected electric vehicles includes battery use histograms.

7. The battery management system of claim 1, wherein the actual battery use data of the specific electric vehicle and the historical battery use data include operation histograms and storage histograms.

8. A non-transitory computer readable medium having computer readable instructions stored thereon that are executable by a processor to:
    provide battery management system (BMS) in a specific electric vehicle, having a wide area network connected to multiple network connected electric vehicles, wherein each network connected electric vehicle is powered by one or more batteries and has one or more sensors for collecting historical battery use data;
    receive, at the BMS, a number of historical battery use histograms including the historical battery use data from a first number of the multiple network connected electric vehicles to reduce a load on a bandwidth of the wide area network, an actual battery use histogram including actual battery use data from the specific electric vehicle, and an expected battery use histogram including expected battery use data from the specific electric vehicle; and
    calculate capacity degradation of a battery of the specific electric vehicle based on the historical battery use data, the actual battery use data, and the expected battery use data.

9. The computer readable medium of claim 8, wherein the computer readable instructions are executed by the processor to calculate a lifetime of the battery of the specific electric vehicle based on the historical battery use data from the first number of the multiple network connected electric vehicles, actual battery use data of the specific electric vehicle, and expected battery use data of the specific electric vehicle.

10. The computer readable medium of claim 8, wherein the actual battery use data includes state of charge, charge throughput, current amplitude, time duration, and temperature data.

11. The computer readable medium of claim 8, wherein the historical battery use data from the first number of the multiple network connected electric vehicles includes state of charge, charge throughput, current amplitude, time duration, and temperature data.

12. The computer readable medium of claim 8, wherein the computer readable instructions are executed by the processor to send the historical battery use data from battery management systems in the first number of the multiple network connected electric vehicles to a database.

13. A method for calculating a lifetime of a battery in a specific electric vehicle, comprising:
   providing a wide area network connected to multiple network connected electric vehicles, wherein each of the network connected electric vehicles is powered by one or more batteries and has one or more sensors for collecting historical battery use data;
   receiving, at a battery management system (BMS) within a specific electric vehicle, the historical battery use data from a first number of the multiple network connected electric vehicles after a battery of one or more of the first number of the multiple network connected vehicles reaches a particular battery charge throughput or after a particular distance traveled by one or more of the first number of the multiple network connected electric vehicles to reduce an amount of data passing through the wide area network, actual battery use data from the specific electric vehicle, and expected battery use data from the specific electric vehicle; and
   calculating the lifetime of the battery of the specific electric vehicle based on the historical battery use data, the actual battery use data, and the expected battery use data.

14. The method of claim 13, wherein the method further includes calculating capacity degradation of the battery of the specific electric vehicle based on the historical battery use data, the actual battery use data, and the expected battery use data.

15. The method of claim 14, wherein the actual battery use data of the specific electric vehicle is in an actual battery use histogram and the expected battery use data of the specific electric vehicle is in an expected battery use histogram.

16. The method of claim 13, wherein the method further includes calculating battery state of health of the specific electric vehicle by interpolating an actual battery use histogram.

17. The method of claim 13, wherein calculating the lifetime of the battery of the specific electric vehicle includes estimating a period of time after which a predicted battery state of health of the specific electric vehicle reaches a threshold value.

18. The method of claim 13, wherein the historical battery use data from the first number of the multiple network connected electric vehicles includes state of charge, charge throughput, current amplitude, time duration, and temperature data.

* * * * *